Feb. 17, 1959 — H. C. ALBERTSEN — 2,874,118
UPFLOW CLARIFIER APPARATUS
Filed May 26, 1955
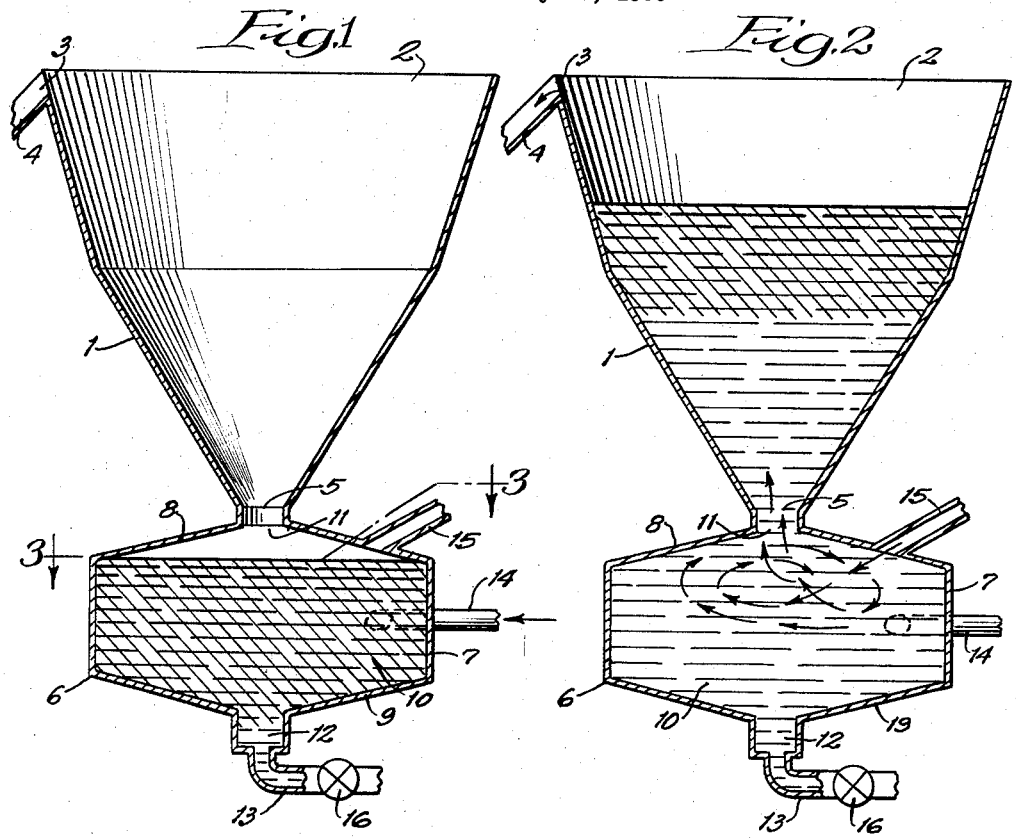
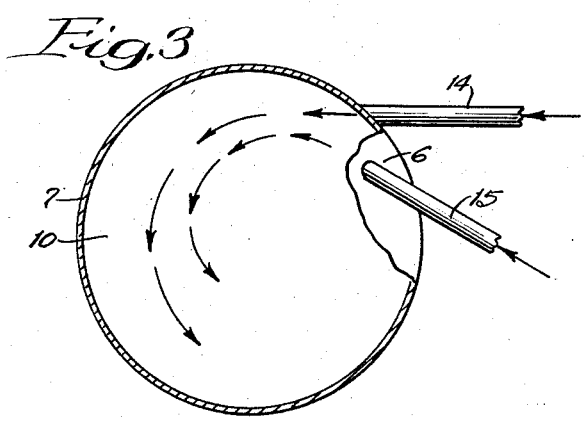
INVENTOR:
Hans C. Albertsen,
BY
Dawson, Tilton + Graham,
ATTORNEYS.

United States Patent Office 2,874,118
Patented Feb. 17, 1959

2,874,118
UPFLOW CLARIFIER APPARATUS

Hans C. Albertsen, Lee's Summit, Mo.

Application May 26, 1955, Serial No. 511,389

2 Claims. (Cl. 210—205)

This invention relates to upflow clarifiers, and more specifically, to an improved apparatus for recirculating and maintaining a sludge blanket in a suspended state within an upflow clarifier.

In the art of softening water by means of upflow clarifiers, it is customary to provide an inverted cone-shaped tank having an inlet or mouth at its funnel-like base and an outlet near the expanded top of the tank. To remove the "hardness" caused by dissolved salts in the water, the water and one or more chemicals such as calcium hydroxide are introduced into the mouth of the tank. Carbonates dissolved in the water thus react with the hydroxide to form a lime precipitate which is carried by the upwardly flowing water to a point within the tank where the speed of the upward flow is reduced sufficiently by the increased diameter of the tank to hold the precipitate in suspension. This suspended precipitate or floc, commonly called a sludge blanket, promotes the further removal of carbonate hardness from the water passing upwardly through the blanket. Finally, softened water reaches the top of the tank and is carried away by suitable means.

One of the major difficulties in softening water by the upflow clarifier method arises from the accumulation of completely reacted precipitate which often necessitates the shutting down of the clarifier. Precipitate which is no longer suspended by upwardly flowing water, frequently drops downwardly and jams the mouth of the clarifier so tightly that resumed water pressure fails to dislodge it. As a result, the entire apparatus may require dismantling and cleaning.

Therefore, one of the main objects of this invention is to overcome the abovementioned difficulties by means of a recirculation chamber interposed between the clarifier's narrow mouth and the conduits carrying water and chemicals to the clarifier. Another object is to provide a relatively simple and efficient means for reconstituting a suspended sludge blanket when operation of a clarifier is to be resumed. A further object is to provide a recirculation chamber below and in communication with an inverted, cone-shaped sludge blanket clarifier for the recirculation of floc which has settled to the base of the chamber. A still further object is to provide a recirculation tank for sludge blanket clarifiers equipped with angled inflow conduits arranged at different elevations for producing fluid circulation and turbulence within the tank.

Further objects will appear from the drawings and specification, in which:

Fig. 1 is a sectional side elevation of a sludge blanket clarifier apparatus, showing floc settled within the recirculation chamber of the present invention; Fig. 2 is similar to Fig. 1, but shows the recirculation of floc within the recirculation and clarification tanks; and Fig. 3 is a cross-sectional view taken along lines 3—3 of Fig. 1.

Figs. 1 and 2 illustrate an upflow clarifier apparatus equipped with an inverted, cone-shaped clarification tank 1 providing a conical clarification chamber 2. Near the open top of the tank 1 is an outlet 3 leading into conduit 4 for the removal of water from the top of the conical tank.

The conical clarification tank 1 is provided with an inlet or mouth 5 at its lowermost portion or apex. Directly below tank 1 is a second tank 6 which has lateral dimensions at least as great as the diameter of the lower portion of tank 1, and which will be referred to as the recirculation tank. The recirculation tank preferably has a generally cylindrical configuration with a tubular side wall 7 and slightly conical top and bottom walls 8 and 9, respectively. As shown in Figs. 1 and 2, the top and bottom walls are arranged in concave opposing relation and, in conjunction with side wall 7, provide a recirculation chamber 10.

In the top wall 8 of the recirculation tank 6 is an opening 11 in register with the inlet 5 of the clarification tank which places the clarification and recirculation chambers in communication with each other. The bottom wall 9 of the recirculation tank may be equipped with a sump 12 connected to a discharge pipe 13 which in turn may be equipped with a valve 16 for drawing off excess sludge or floc which may settle within chamber 10. If it is desired, the sludge draw off device may be automatically operated and may be adapted to leave a certain amount of "start up" sludge within chamber 10 after the bulk of floc has been removed therefrom.

Water and one or more chemicals, such as calcium hydroxide, may enter the recirculation chamber 10 by means of inflow conduits 14 and 15. While I have shown only a pair of such conduits, a greater number may be provided depending upon the capacity of a particular apparatus, the fluid pressure available, and the degree of turbulence which is desired within the recirculation chamber. As illustrated more clearly in Fig. 3, the inflow conduits preferably form oblique angles with radial axes of the cylindrical recirculation tank at the points of juncture with the tank and are also mounted in converging relation to each other so that the stream of fluid flowing from each of the conduits merge within the tank. As a result, the water and chemicals discharged from the conduits follow a spiral path within the recirculation chamber and are forced upwardly through the mouth 5 of the clarification tank 1 into chamber 2. Additional turbulence within recirculation chamber 10 is achieved by mounting the inflow conduits at different elevations upon tank 6, and inclining the upper conduit 15 downwardly and inwardly toward conduit 14. While the most desirable arrangement of the inflow conduits is shown in Figs. 1–3, it will be understood that these conduits might be joined before or at their point of entry into tank 7 to produce less satisfactory, but nevertheless effective results.

Operation

When the upflow clarifier apparatus is in operation, hard water from conduit 14 and calcium hydroxide, or any other suitable chemical or chemicals, from conduit 15 circulate within chamber 10 and are forced upwardly into chamber 2 through the narrow mouth of tank 1. The dissociated magnesium and calcium salts responsible for the "hardness" of water, such as calcium bicarbonate, magnesium bicarbonate and magnesium sulfate, react with the hydroxide to form a precipitate of insoluble calcium carbonate and magnesium hydroxide particles. In the middle region between the mouth and the top of clarification tank 1, the precipitate or floc becomes suspended, moving neither upwardly nor downwardly, as a result of the reduced speed of upward flow caused by the increased diameter of tank 1. This condition is illustrated in Fig. 2. Water, "softened" by the removal of dissolved calcium and magnesium compounds, ultimately reaches the top of the clarification chamber and flows through opening 3.

If for any reason the supply of water and calcium hydroxide is discontinued, the floc or sludge and contact material drops downwardly through the constricted mouth of the clarification tank and settles in the recirculation tank, as shown in Fig. 1. When the flow of fluid through the inflow conduits is resumed, turbulence is produced within the recirculation chamber and the agitated particles of floc are once again carried upwardly into the clarification chamber. A sludge blanket is therefore reconstituted within the clarification chamber, without the necessity of dismantling and cleaning the apparatus, by merely providing a flow of fluid through the inflow conduits.

While I have disclosed my invention in considerable detail for the purpose of illustration, it will be apparent to one skilled in the art that these details may be varied considerably without departing from the spirit of the invention.

I claim:

1. In an upflow lime-reacting water softening apparatus, an inverted conical reaction tank having an opening at the apex thereof and having a chamber for intermixing and reacting hard water and lime therein to form a suspended precipitate, a cylindrical recirculation tank having a chamber therein and being disposed below said reaction tank, said recirculation tank having a substantially larger diameter than the opening of said reaction tank and communicating with said reaction tank through said opening, said recirculation tank being of sufficient volume to accommodate all of the precipitate disposed at any given time of normal operation within said reaction chamber, said recirculation tank being equipped with at least one angularly disposed inflow conduit in an upper wall portion thereof for directing a stream of liquid inwardly and downwardly into said recirculation chamber, said recirculation tank also being provided with a discharge opening at the lowermost portion thereof for the removal of precipitate from said recirculation chamber during interruption in the operation of said apparatus, whereby, when a water softening operation is temporarily discontinued all of the precipitate in said reaction tank settles into said recirculation chamber for removal of a portion of said precipitate through said discharge opening, and when water softening operation is thereafter resumed the stream of liquid through the inflow conduit of said recirculation tank agitates the precipitate remaining therein and circulates same back into said reaction tank.

2. In an upflow water softening apparatus having an inverted conical reaction tank provided with openings adjacent the upper and lower portions thereof and adapted to contain a precipitate blanket formed by the interaction of upflowing hard water and lime, a generally cylindrical recirculation tank being mounted below said reaction tank and having a chamber therein in communication with the reaction tank through the lower opening thereof, said recirculation tank having a substantially larger horizontal diameter than the lower opening of said conical reaction tank and having sufficient capacity to accommodate all of the precipitate normally suspended within said reaction tank during a water softening operation, said recirculation tank also being equipped with at least one angularly disposed inflow conduit terminating in an opening in an upper wall portion thereof for directing a stream of liquid inwardly and downwardly into said recirculation tank, said recirculation tank also being provided with a discharge orifice at the lower end thereof for the removal of precipitate therefrom upon interruption of a water softening operation.

References Cited in the file of this patent

UNITED STATES PATENTS

| | | |
|---|---|---|
| 1,508,177 | Frazier | Sept. 9, 1924 |
| 1,671,864 | Higgins | May 29, 1928 |
| 1,702,257 | Green | Feb. 19, 1929 |
| 2,272,026 | Spaulding | Feb. 3, 1942 |
| 2,368,354 | Green | Jan. 30, 1945 |
| 2,436,375 | Booth et al. | Feb. 24, 1948 |